(12) United States Patent
Hoovestol

(10) Patent No.: US 7,651,043 B2
(45) Date of Patent: Jan. 26, 2010

(54) BALE GRINDER

(75) Inventor: Russell J. Hoovestol, Jamestown, ND (US)

(73) Assignee: DuraTech Industries Internatioal, Inc., Jamestown, ND (US)

( * ) Notice: Subject to any disclaimer, the term of this patent is extended or adjusted under 35 U.S.C. 154(b) by 0 days.

(21) Appl. No.: 11/300,792

(22) Filed: Dec. 15, 2005

(65) Prior Publication Data

US 2007/0138328 A1   Jun. 21, 2007

(51) Int. Cl.
*B02C 19/00* (2006.01)

(52) U.S. Cl. .................................. 241/189.1; 241/605

(58) Field of Classification Search ................ 241/605, 241/189.1, 101.763; 414/24.5, 111, 555, 414/911, 24.6, 785, 25
See application file for complete search history.

(56) References Cited

U.S. PATENT DOCUMENTS

| 4,449,672 | A |   | 5/1984  | Morlock et al. ............. 241/101 |
|-----------|---|---|---------|-------------------------------------|
| 4,579,497 | A | * | 4/1986  | Nine ......................... 414/24.5 |
| 4,687,402 | A | * | 8/1987  | Zatylny .................... 414/24.6 |
| 4,779,810 | A |   | 10/1988 | Frey .......................... 241/101 |
| 4,830,292 | A |   | 5/1989  | Frey .......................... 241/101 |
| 4,951,883 | A |   | 8/1990  | Loppoli et al. ............. 241/101 |
| 5,033,683 | A |   | 7/1991  | Tayler ........................ 241/101 |
| 5,071,079 | A |   | 12/1991 | Fykse et al. ................ 241/101 |
| 5,090,630 | A |   | 2/1992  | Kopecky et al. ........... 241/279 |
| 5,340,040 | A |   | 8/1994  | Bussiere et al. ............ 241/101 |
| 5,601,241 | A |   | 2/1997  | Brewster ................ 241/101.76 |
| 5,653,394 | A |   | 8/1997  | Bussiere et al. ........ 241/101.742 |
| 6,109,553 | A |   | 8/2000  | Hruska ..................... 241/189.1 |
| 6,375,104 | B1 |  | 4/2002  | Hruska ..................... 241/189.1 |
| 6,644,575 | B1 | * | 11/2003 | Farrell ................. 241/101.762 |
| 7,156,333 | B2 | * | 1/2007  | Lepage et al. .......... 241/101.763 |
| 2004/0218999 | A1 | * | 11/2004 | Ackerman et al. ............ 414/25 |

FOREIGN PATENT DOCUMENTS

| CA | 2171146   | 3/1996  |
| CA | 2179121   | 6/1996  |
| CA | 2191692   | 11/1996 |
| CA | 2202014   | 4/1997  |
| CA | 2236953   | 5/1998  |
| CA | 2282334   | 11/2001 |
| GB | 2 100 106 | 12/1982 |

OTHER PUBLICATIONS

Brochure, Load and Feed Big Bales from Your Tractor or Pickup, Deweze Super Slicer, 2 pages, date unknown.
Brochure, Buffalo Equipment, Round Bale Bunk Feeder Reduces Hay Waste, 2 pages, date unknown.

* cited by examiner

*Primary Examiner*—Mark Rosenbaum
(74) *Attorney, Agent, or Firm*—Z. Peter Sawicki; Westman, Champlin & Kelly, P.A.

(57) ABSTRACT

A machine for grinding forage material includes a support frame that supports an enclosure for retaining a bale of forage material. A rotary shredder is positioned within the enclosure where the rotary shredder grinds the bale of forage material and discharges a forage material from the enclosure. The machine includes at least two deflectors attached to the enclosure that deflect the shredded forage material onto a surface where the at least two deflectors are positionable independent from each other.

16 Claims, 5 Drawing Sheets

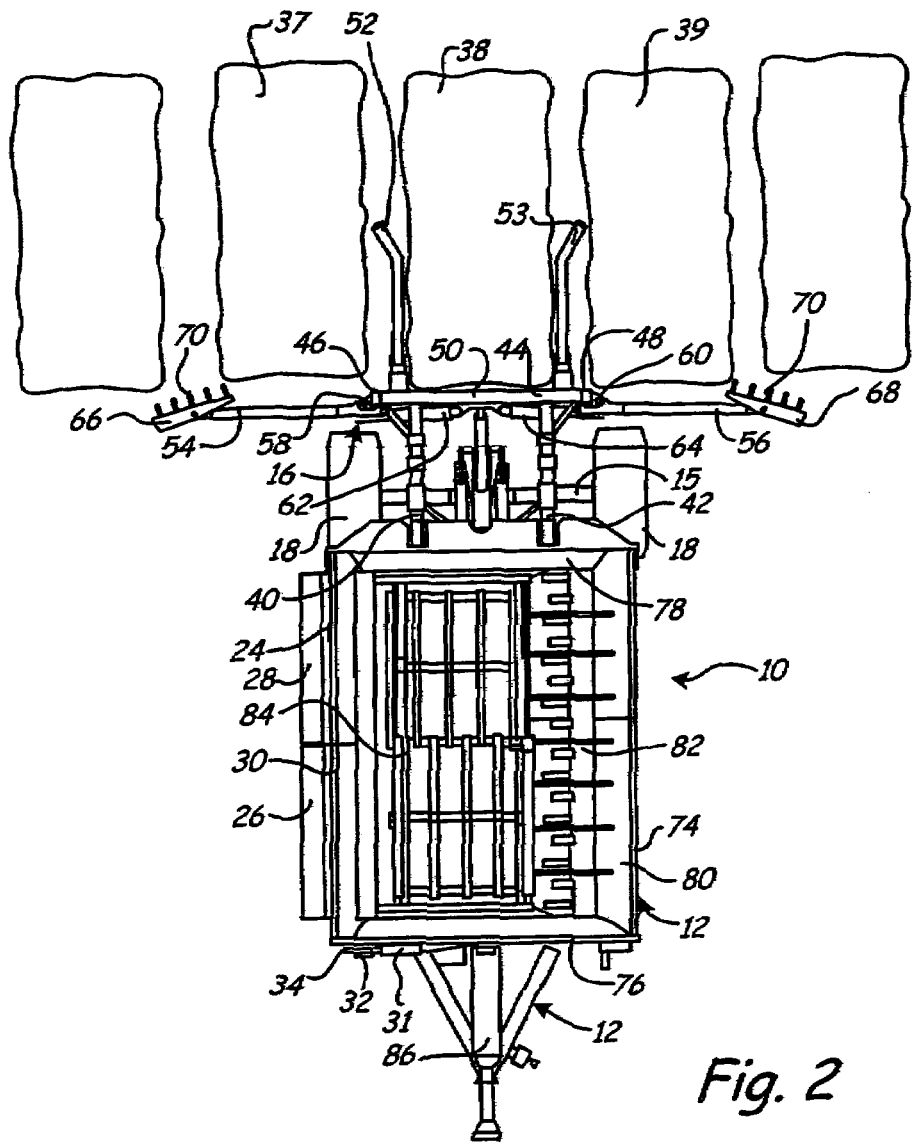
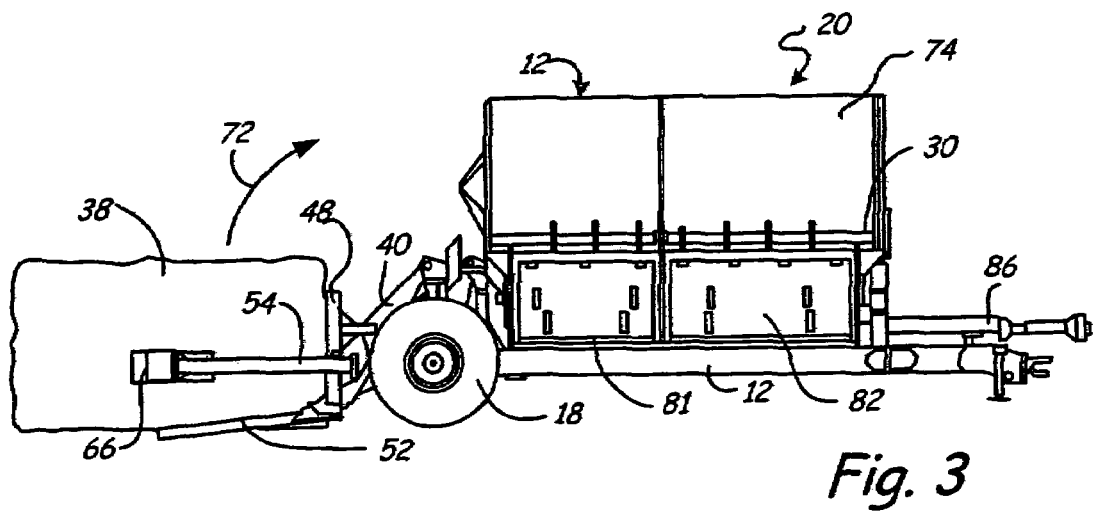

BALE GRINDER

BACKGROUND OF THE INVENTION

The present invention relates to a farm implement. More particularly, the present invention relates to a farm implement for grinding a bale of forage material.

Livestock producers utilize large round or rectangular cross-sectional bales that range in weight between about 500 and 2,200 pounds to provide forage material and bedding material for livestock. The weight and size of the bales makes moving and positioning of the bales with manual force impractical. Further, the large round and square cross-sectional bales are densely compacted which makes disbursement of the forage material with manual force difficult, if not impossible.

A bale grinder is used to mechanically lift the bale into an enclosure having a rotary grinder positioned at a bottom of an enclosure. The rotary grinder shreds and discharges the forage material onto the ground for the livestock, such as cattle, to consume. The bale grinder typically has a deflector which directs the discharged forage material onto a selected area of the ground.

The bales, when dropped into the enclosure, have a tendency over time of damaging the enclosure walls, a conveyor or other mechanism used to urge the bale into the rotary grinder, and the rotary grinder because of the bale's weight. The damaged components require replacement for the bale grinder to function properly which causes the livestock producer to incur expenses in maintaining the bale grinder.

SUMMARY OF THE INVENTION

The present invention includes a machine for grinding bales of forage material. The machine includes a support frame upon which an enclosure is supported. The enclosure is of sufficient size to retain a bale therein. A rotary shredder is positioned within the enclosure wherein the rotary shredder grinds the bales of forage material and discharges the forage material from the enclosure through an opening in a sidewall. At least two deflectors are attached to the enclosure wherein the at least two deflectors deflect the shredded forage material onto the ground and where the at least two deflectors are positionable independent from each other.

BRIEF DESCRIPTION OF THE DRAWINGS

FIG. 2 is a top view of the bale grinder of the present invention having an engaging end proximate a bale.

FIG. 3 is a side view of the bale grinder of the present invention having the engaging end engaging the bale.

DETAILED DESCRIPTION

Figure 1:
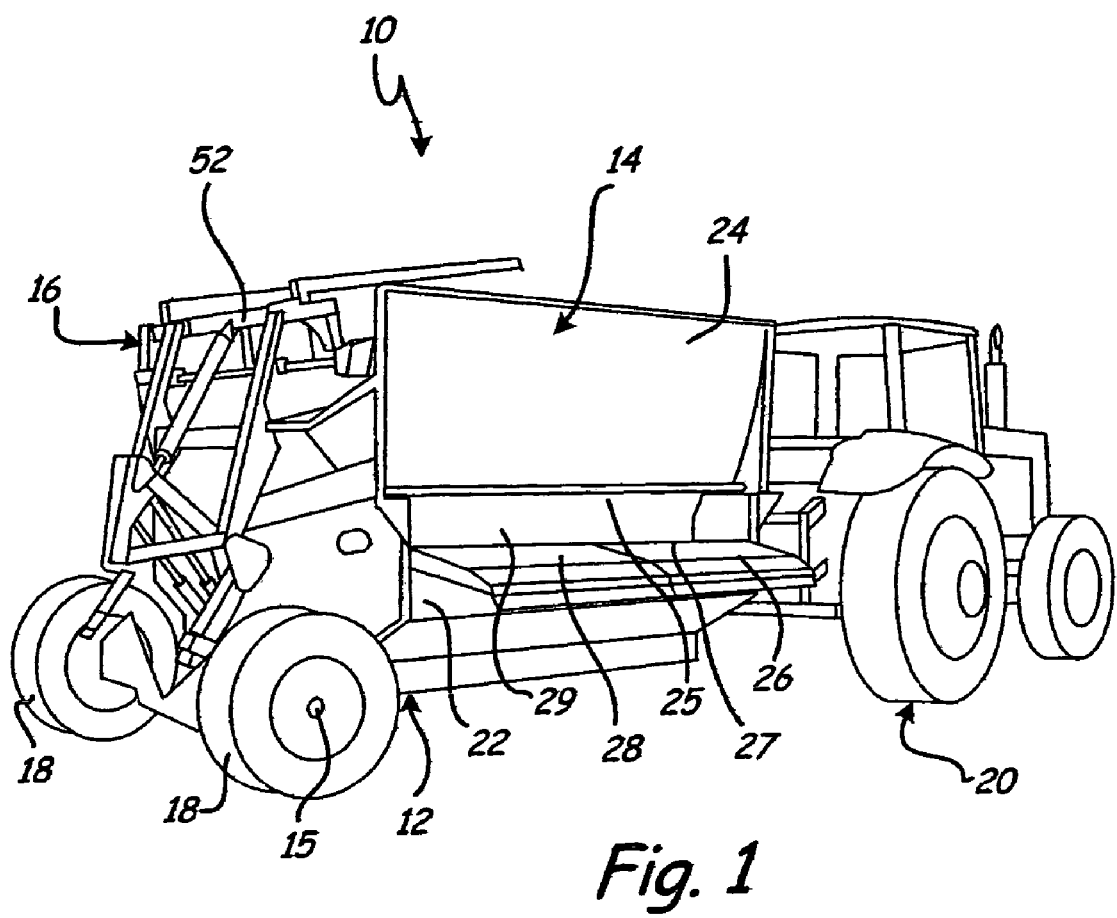
FIG. 1 is a perspective view of the bale grinder of the present invention being towed by tractor.

A bale grinder of the present invention is generally illustrated in FIG. 1 at 10. The bale grinder 10 includes a frame 12 that supports an enclosure 14 having a sufficient size for accepting a bale of forage material. The frame 12 also supports a bale engaging end 16 that engages, lifts and rotates a bale of forage material substantially 180° from the ground to another surface within the enclosure 14. The frame 12 is supported by an axle 15 having wheels 18 positioned on opposite ends of the axle 16 where the wheels 18 rotate to move the bale grinder 10 when towed by a tractor 20 or other prime mover.

Referring to FIGS. 1-3 and 8, a power take off drive 86 is attached to the tractor 20 and is used for powering a flail type cylinder 82. A conveyor 84, which urges a bale 38 of forage material into the flail type cylinder 82 is powered by a variable speed hydraulic motor (not shown). The flail type cylinder 82 discharges the forage material 38 through an opening 22 in a right side wall 24 of the enclosure 12. While a flail type cylinder 82 is illustrated, any rotary grinder capable of grinding and discharging the forage material 38 is within the scope of the present invention.

As the forage material 38 is discharged from the opening 22, the forage material 38 contacts a front deflector 26 and a rear deflector 28. The front and rear deflectors 26, 28 direct the forage material 38 onto the ground or other surface.

Referring to FIGS. 1-3 and 7, the front deflector 26 and the rear deflector 28 are independently positionable into either a lowered position where the forage material 38 is directed onto the ground proximate the bale grinder 10 or an elevated position where the forage material 38 is deflected into an area further away from the bale grinder 10. The deflectors 26, 28 are independently positionable from each other and allow the forage material 38 to be discharged onto a larger area of ground. Spreading the forage material 38 onto a larger area allows a larger number of livestock to consume the forage material 38 at the same time and also to minimize competition for the forage material 38.

Referring to FIGS. 1 and 2, the front and rear deflectors 26, 28 are each attached to a shaft 30 with rigid braces 27, 29, respectively. The rigid braces 27, 29 are fixedly attached to both the front and rear deflectors 26, 28 respectively, and the shaft 20.

The shaft 30 runs a length of the right side wall 24. A hydraulic cylinder 31 is coupled to a collar 34 that is attached to an end of the shaft 30 with a pivot pin 32. As the cylinder 31 is extended, the shaft 30 rotates and moves the rear deflector 28 into a downward position. Further rotation of the shaft 30 positions the front deflector 26 into a downward position.

As the cylinder 31 is retracted, the front deflector 26 is positioned into an elevated position. Further retraction of the cylinder 31 causes rotation of the shaft 30 and raises the rear deflector 28 into an elevated position.

Figure 7:
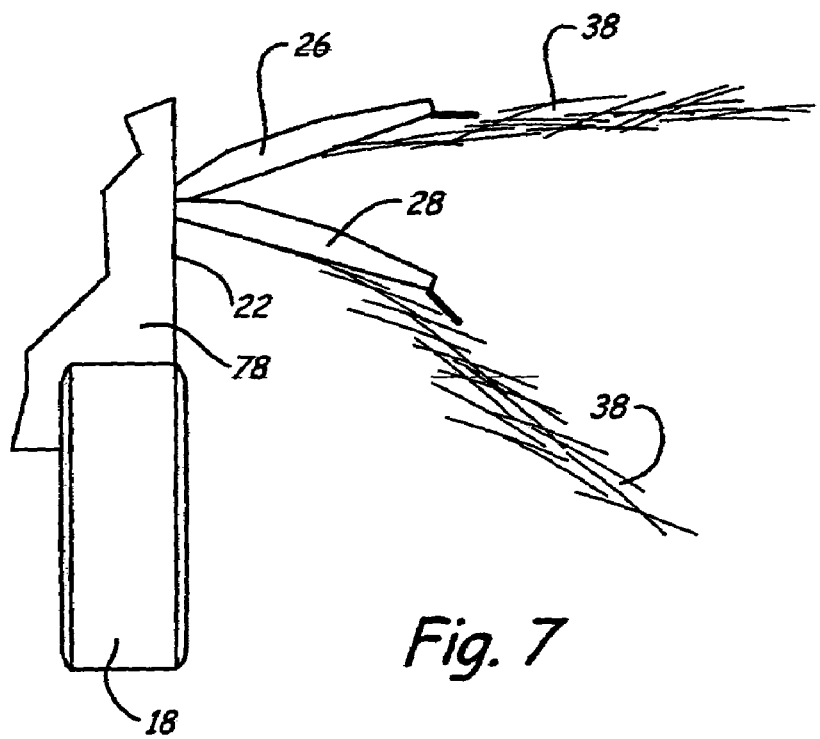
FIG. 7 is a partial side view of the enclosure showing two deflectors independently positioned at different positions to direct the discharged forage material from the enclosure.
Figure 8:
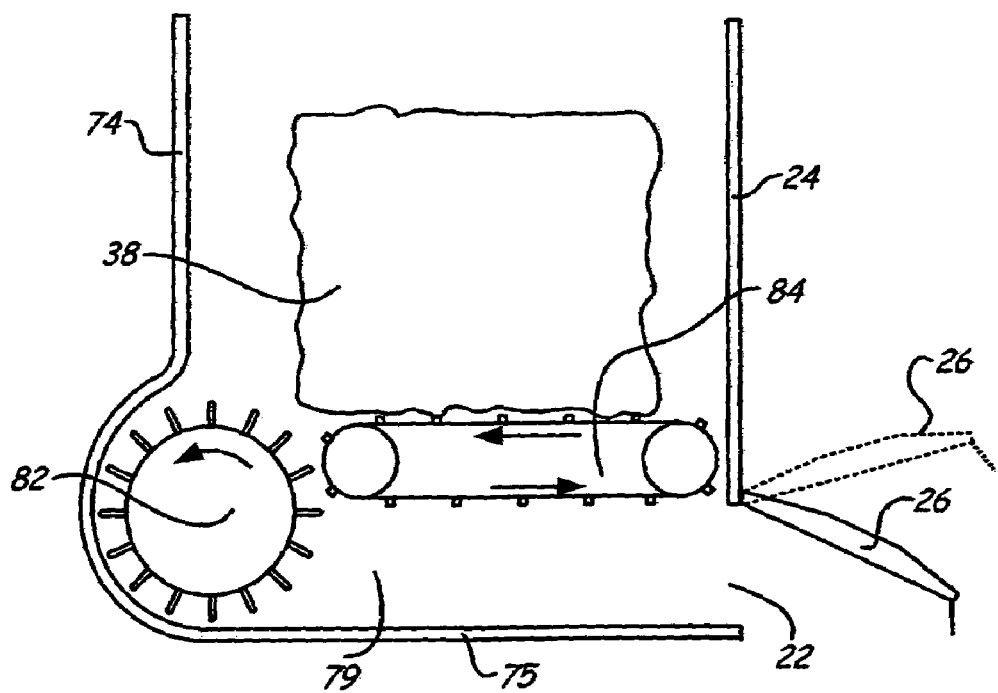
FIG. 8 is a sectional view of the enclosure illustrating a bale being urged into the rotary grinder and illustrating the positions of the movable deflectors.

The hydraulic cylinder 31 coupled to the shaft 30 provides a two-stage hydraulically powered actuating mechanism which independently positions the front deflector 26 and the rear deflector 28 to customize the discharge profile of the forage material 38 from the bale grinder 10 as best illustrated in FIGS. 7 and 8. However, other actuating mechanisms are within the scope of the present invention including separate actuators attached to the enclosure and each deflector 26, 28.

The engaging end of the bale grinder 10 is capable of engaging a bale 38 that is positioned between adjacent bales 37 and 39. The engaging end of the bale grinder 10 includes left and right engaging arms 54, 56 that are capable of moving horizontally to a position approximately 180° from each other. The engaging end 16 also includes left and right tines 52 and 53 that extend forwardly or toward the bale 37. With the tines 52 and 53 extending toward the bale 37 and along with the left and right engaging arms being disposed 180° from each other, the bale grinder 10 can approach a row of bales and pull the bale out of the row without disturbing adjacent bales such as 37 and 39.

To accomplish this purpose, the engaging end 16 includes left and right main braces 40, 42 that are pivotally attached to the frame 12. The bale engaging wall 44 is attached to distal ends of main braces 40, 42. The bale engaging wall includes left and right supports 46, 48 that are attached to the main braces 40, 42. Top and bottom bars 50, 51 are attached to the left and right supports 46, 48, respectfully such that as the bale grinder is moved toward the bale 38, the bale engaging wall 44 abuts against the bale 38.

The tines 52 and 53 are attached to the bottom bar 51 extending in a direction away from the bale engaging wall 44. The tines 52 and 53 are spaced apart such that the tines 52 and 53 engage the bale 38 near or at its bottom so that when the engaging end 16 is lifted, the tines 52 and 53 by engaging the bottom of the bale 38, lift the bale 38 off the ground so that the bale can be removed from the row of bales by moving the bale grinder away from the wall.

After the bale 38 is removed from the row of bales, the left and right engaging arms 54, 56, are pivoted about pivot pins 58, 60 by left and right hydraulic cylinders 62, 64, all respectively. The left and right hydraulic cylinders 62, 64, are pivotally attached to the left and right supports 46, 48, and to the left and right engaging arms 54, 56 respectively.

The left and right engaging arms 54, 56, have pivotally attached bale engaging plates 66, 68. The bale engaging plates include spike 70 that extend outwardly from the bale engaging plate 66, 68 and are sufficiently long and rigid to penetrate a bale of hay.

As the left and right cylinders 62, 64 are extended, the left and right engaging arms 54, 56 pivot towards the bale 38 such that the bale engaging plates 66, 68 move toward the bale 38. As the bale engaging plates 66, 68 move toward the bale 38, spikes 70 penetrate the bale 38 and secure the bale 38 to the engaging end 16.

The bale grinder 10 of the present invention is capable of picking up a bale such as bale 38 and placing the bale 38 with the bale grinding enclosure 14 in the manner that does not drop the bale of hay within the enclosure thereby avoiding damage to the enclosure. Repeated dropping of large bales of hay, no matter how sturdy the enclosure is built, can over time damage the bale grinder 10.

Figure 4:
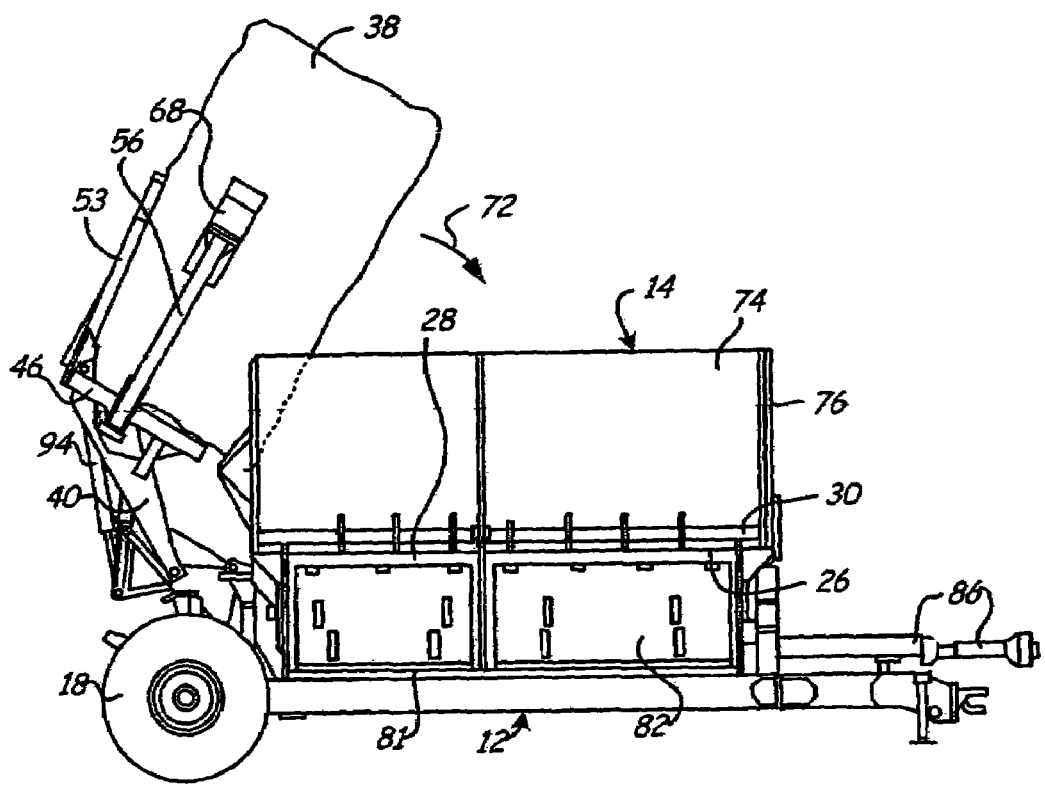
FIG. 4 is a side view of the bale grinder of the present invention wherein the engaging end is lifting the bale to an intermediate position.

The enclosure 14 includes the right side wall 24, a left side wall 74 having generally the same size as the right side wall 24 and a front side wall 76 having an upper edge that is generally even with upper edges of the left and right side walls 24, 74, respectively as illustrated in FIGS. 3 and 4. A back side wall 78 is attached to the left and right side walls 24, 74 and has an upper edge that is lower than the upper edges of the right side wall 24, the left side 74, and the front wall 76 such that the bale 38 is more easily positioned within the enclosures 14 with the engaging end 16. The enclosure 14 includes an open interior space 80 which is of a size, shape and volume to accept either a large substantially square cross-sectional bale or a large substantially round cross-sectional bale.

A conveyor 84, which is driven by the variable speed hydraulic motor (not shown), urges the bale 38 into the flail grinder 82, which is powered by the tractor 20 through the power take off drive 86, as illustrated in FIG. 8. The flail grinder 82 grinds and discharges the forage material 38 through a passage 79 between the bottom surface 81 and the bottom of the conveyor 84 and through the opening 22 in the right side wall 24.

Figure 5:
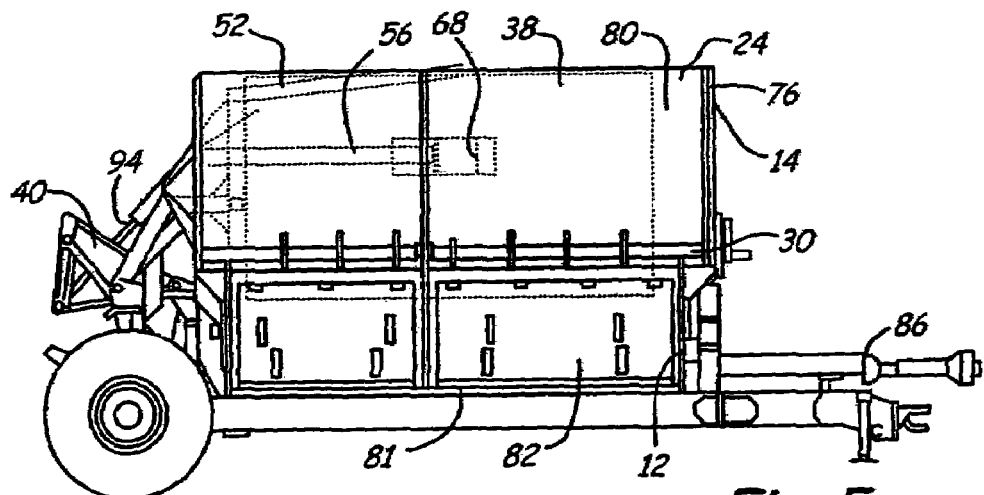
FIG. 5 is a side view of the bale grinder of the present invention wherein the engaging end positions the bale within the enclosure.
Figure 6:
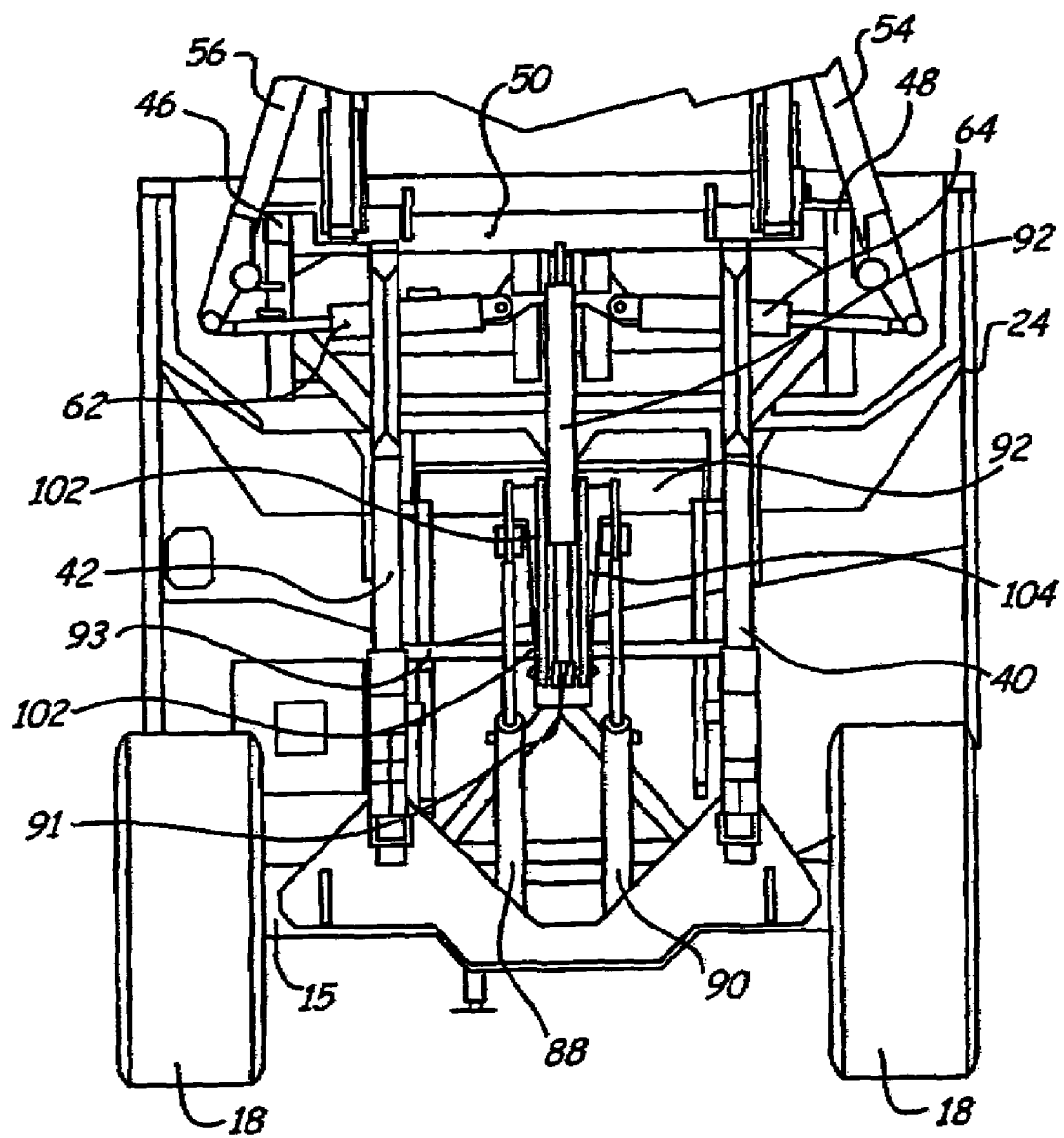
FIG. 6 is a back view of the bale grinder of the present invention wherein a bale engaging end is positioned into a position wherein the bale is positioned within the enclosure.

The bale 38 is lifted by engagement through the left and right engaging arms 54, 56 and the tines 52, 53 to an intermediate position beyond a vertical plane by left and right main cylinders 88, 90, as illustrated in FIGS. 4 through 6. The left and right cylinders are pivotally attached to the frame 12 and are also pivotally attached to a top end of a right angled brace 100.

The right angled brace 100 includes parallel and substantially identical side members 102, 104. Ends of the side members 102, 104 are attached to cross braces 92, 95 that are secured between the main braces 40 and 42. As the cylinders 88 and 90 are extended, the engaging end 16 pivots upward in the general direction of arrow 72 to lift the bale 38 beyond the vertical plane. The bale 38 is retained to the engaging end 16 while in the elevated intermediate position by the retaining arms 50, 52 having the bale engaging plates 66, 68 with the spikes 70 embedded within the bale 38 and tines 52 and 53.

A second drive cylinder 94 is pivotally attached to a beam 91 secured between the side members 102, 104 proximate the right angles as illustrated in FIGS. 5 and 6. Another end of the second drive cylinder 94 is pivotally attached to the bottom bar 50 of the bale engaging wall 44. As the second drive cylinder is extended, the bale 38 is positioned onto the conveyor 84.

The independent operation of the hydraulic cylinders 88, 90 and the cylinder 94 allow the bale 38 to be rotated essentially 180° from a substantially horizontal position on the ground to a substantially horizontal position on the conveyor 84. Because the bales 38 of forage material weigh between about 500 pounds and 2,200 pounds, depending upon the type of forage material and moisture content, gently positioning the bale 38 onto the conveyor 84 prevents damage to the side walls 24, 74, 76, and 78, the conveyor 84 and the cylindrical flail grinder 82.

When a bale 38 having the weight of a large bale is dropped into the enclosure 14, there is a tendency for the side walls 24, 74, 76, 78 to bend and weaken and the conveyor 84 and the flail grinder 82 to become damaged. The two step lifting process of the present invention prevents the bale grinder 10 from being damaged by a large bale 38 being dropped within the enclosure 14 because the two step lifting process positions the bale 38 without dropping the bale on the conveyor 84. Positioning the bale 38 on the conveyor 84 minimizes the impact of the bale 38 on all components of the bale grinder 10.

With the bale 38 positioned within the enclosure 14, the hydraulic cylinders 62, 64 are retracted to disengage the spikes 70 68 from the bale 38. With the spikes 70 disengaged from the bale 38, the cylinder 94 is first retracted followed by retraction of the cylinders 88 and 90 such that the bale engaging end 16 is positioned once again near the ground.

With the engaging end 16 near the ground, the tractor 20 can be used to back the bale grinder 10 towards another bale 38 such that the engaging end 16 engages the next bale 38. The engaging arms 54 and 56 are re-positioned such that the spikes 70 extending from the engage plates 66, 68 are embedded within the bale 38. With the second bale 38 secured to the engaging end 16 by the outward extending tines 52 and the engaging arms 54 and 56, the second bale 38 can be lifted above ground level by the main hydraulic cylinders 88, 90 such that the bale grinder 10 can be used to grind a bale 38 positioned within the enclosure 14 while transporting a second bale 38 with the bale engaging end 16 thereby allowing two bales to be ground into forage material during the same trip.

Although the present invention has been described with reference to preferred embodiments, workers skilled in the art will recognize that changes may be made in form and detail without departing from the spirit and scope of the invention.

What is claimed is:

1. A machine for grinding bales of forage material comprising:
   a support frame;
   an enclosure supported by the support frame for accepting the bale therein the enclosure having a front and rear and two sides positioned between the front and rear;
   a rotary shredder positioned within the enclosure for grinding the bale of forage material and discharging the forage material from the enclosure through one of the sides; and
   a bale engaging end movably attached to the frame wherein the bale engaging end comprises at least two bale engaging arms that are moveable horizontally between a position in which the arms are substantially parallel to each other to engage opposite arcuate sides of the bale to a position in which the arms are positioned approximately 180° from each other such that the arms are disengaged from the arcuate sides of the bale such that the bale is placed within the enclosure with the arcuate side of the bale facing the sides of the enclosure.

2. The machine of claim 1 and wherein each bale engaging arm comprises:
   a proximal end pivotally attached to the bale engaging end; and
   a distal end having an engaging plate attached thereto wherein the engaging plate comprises a plurality of spikes that penetrate the bale to secure the bale to the bale engaging end.

3. The machine of claim 1 and further comprising a plurality of positioning mechanisms each being pivotally attached to the frame and to each bale engaging arm wherein the plurality of positioning mechanisms urge the bale engaging arms to engage the bale to secure the bale to the bale engaging end.

4. The machine of claim 3 and wherein the plurality of positioning mechanisms comprise a plurality of hydraulic cylinders.

5. The machine of claim 1 wherein the bale engaging end further comprises at least two support tines extending from a bottom end of the bale engaging end for engaging a bottom portion of the bale.

6. The machine of claim 1 and further comprising a lifting mechanism pivotally attached to the frame and the bale engaging end wherein the lifting mechanism lifts the bale upwardly.

7. The machine of claim 1 and further comprising a conveyor positioned within the enclosure wherein the conveyor urges the bale into the rotary shredder.

8. The machine of claim 7 and wherein the rotary shedder and the conveyor are rotatably driven by a power take off shaft coupled to and powered by a prime mover.

9. A machine for grinding a bale of forage material comprising:
   a support frame;
   an enclosure supported by the support frame wherein the enclosure accepts and retains a bale therein the enclosure having a front and rear and a side discharge positioned therebetween;
   a rotary shredder positioned within the enclosure for grinding the forage material and discharging the forage material from the enclosure through the side discharge; and
   a bale engaging end operably attached to the frame for engaging the bale on opposite arcuate sides of the bale and securing the bale thereto such that the bale is lifted off the ground and is moveable to a position approximately 180° from ground lift off to within the enclosure for release at approximately 180° from ground lift off such that the bale is positioned with the arcuate side facing the side discharge.

10. The machine of claim 9 and further comprising:
    a first lifting mechanism for lifting the bale to beyond a substantially vertical plane; and
    a second lifting mechanism for positioning the bale into a substantially horizontal position within the enclosure proximate the rotary shredder prior to the bale engaging end being disengaged from the bale.

11. The machine of claim 10 and wherein the first lifting mechanism comprises at least one hydraulic cylinder.

12. The machine of claim 10 and wherein the first lifting mechanism comprises at least two hydraulic cylinders.

13. The machine of claim 10 and wherein the second lifting mechanism comprises at least one hydraulic cylinder.

14. The machine of claim 9 and further comprising a conveyor positioned within the enclosure for urging the bale into the rotary shredder wherein when the bale is positioned onto the conveyor when the bale is positioned in the substantially horizontal position within the enclosure.

15. The machine of claim 9 and further comprising a plurality of bale engaging arms pivotally attached to the bale engaging end wherein the bale engaging arms secure the bale to the bale engaging end.

16. The machine of claim 9 and further comprising:
    a plurality of deflectors operably attached to the enclosure; and
    a positioning mechanism that operably engages the plurality of deflectors for independently positioning the plurality of deflectors to disperse the forage material exiting the enclosure.

* * * * *

UNITED STATES PATENT AND TRADEMARK OFFICE
CERTIFICATE OF CORRECTION

PATENT NO. : 7,651,043 B2 Page 1 of 1
APPLICATION NO. : 11/300792
DATED : January 26, 2010
INVENTOR(S) : Russell J. Hoovestol It is certified that error appears in the above-identified patent and that said Letters Patent is hereby corrected as shown below:

Claim 3
Col. 5, line 41, change "hale" to "bale"

Col. 5, line 42, change "hale" to "bale"

Signed and Sealed this

Twentieth Day of April, 2010

David J. Kappos
*Director of the United States Patent and Trademark Office*